(12) United States Patent
Solomon et al.

(10) Patent No.: US 9,407,863 B2
(45) Date of Patent: Aug. 2, 2016

(54) SYSTEM AND METHOD FOR PROCESSING VISUAL INFORMATION

(71) Applicant: INTEL CORPORATION, Santa Clara, CA (US)

(72) Inventors: Gary A. Solomon, Hillsboro, OR (US); Steven B. McGowan, Portland, OR (US); John S. Howard, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 20 days.

(21) Appl. No.: 13/630,968

(22) Filed: Sep. 28, 2012

(65) Prior Publication Data

US 2014/0092112 A1    Apr. 3, 2014

(51) Int. Cl.
| | |
|---|---|
| *G09G 5/36* | (2006.01) |
| *H04N 7/14* | (2006.01) |
| *G09G 5/393* | (2006.01) |
| *G06F 1/32* | (2006.01) |
| *G06F 3/14* | (2006.01) |

(52) U.S. Cl.
CPC .............. *H04N 7/147* (2013.01); *G06F 1/3203* (2013.01); *G09G 5/393* (2013.01); *G06F 3/1454* (2013.01); *G09G 2330/021* (2013.01); *G09G 2360/08* (2013.01); *G09G 2370/20* (2013.01)

(58) Field of Classification Search
CPC ........................................................ H04N 7/15
USPC .......................................... 345/545; 715/763
See application file for complete search history.

(56) References Cited

U.S. PATENT DOCUMENTS

| 5,613,103 | A  * | 3/1997  | Nobutani et al.  | 345/556 |
|---|---|---|---|---|
| 2006/0259923 | A1 * | 11/2006 | Chiu | 725/24 |
| 2011/0150433 | A1 * | 6/2011  | Alexandrov et al. | 386/328 |
| 2011/0157256 | A1 * | 6/2011  | Sakamoto | 345/690 |
| 2011/0271332 | A1 * | 11/2011 | Jones et al. | 726/7 |
| 2012/0262537 | A1 * | 10/2012 | Baker et al. | 348/14.08 |
| 2013/0038615 | A1 * | 2/2013  | Hendry et al. | 345/502 |

* cited by examiner

*Primary Examiner* — Kyle Zhai
(74) *Attorney, Agent, or Firm* — KED & Associates LLP

(57) ABSTRACT

An apparatus for processing visual information includes a controller to control display of information in an application window based on first visual information stored in a buffer and second visual information received from one or more sources. The controller outputs the first visual information for display in a first area of the application window and outputs the second visual information for simultaneous display in a second area of the application window. The first visual information is visual information that does not change between a first time and a second time, and the second visual information is visual information that changes between the first time and the second time. The controller may be different from a central processing unit of a host device.

14 Claims, 6 Drawing Sheets

SYSTEM AND METHOD FOR PROCESSING VISUAL INFORMATION

FIELD

One or more embodiments described herein relate to processing visual information.

BACKGROUND

Video conferencing allow users at remote locations to communicate with one another for personal or business reasons. Other applications communicate visual data over a network for media-related or other purposes. In order to perform these applications, the central processing units (CPU) of user terminals are required to remain in an active state for the duration of the application. Continuous use of the CPU for this reason consumes significant power. Moreover, especially in the context of video conferencing, the CPU must continue to output the entire screen of the application at predetermined page or frame rates throughout the duration of the application. This further consumes power and makes the user terminals inefficient.

DETAILED DESCRIPTION

Figure 1:
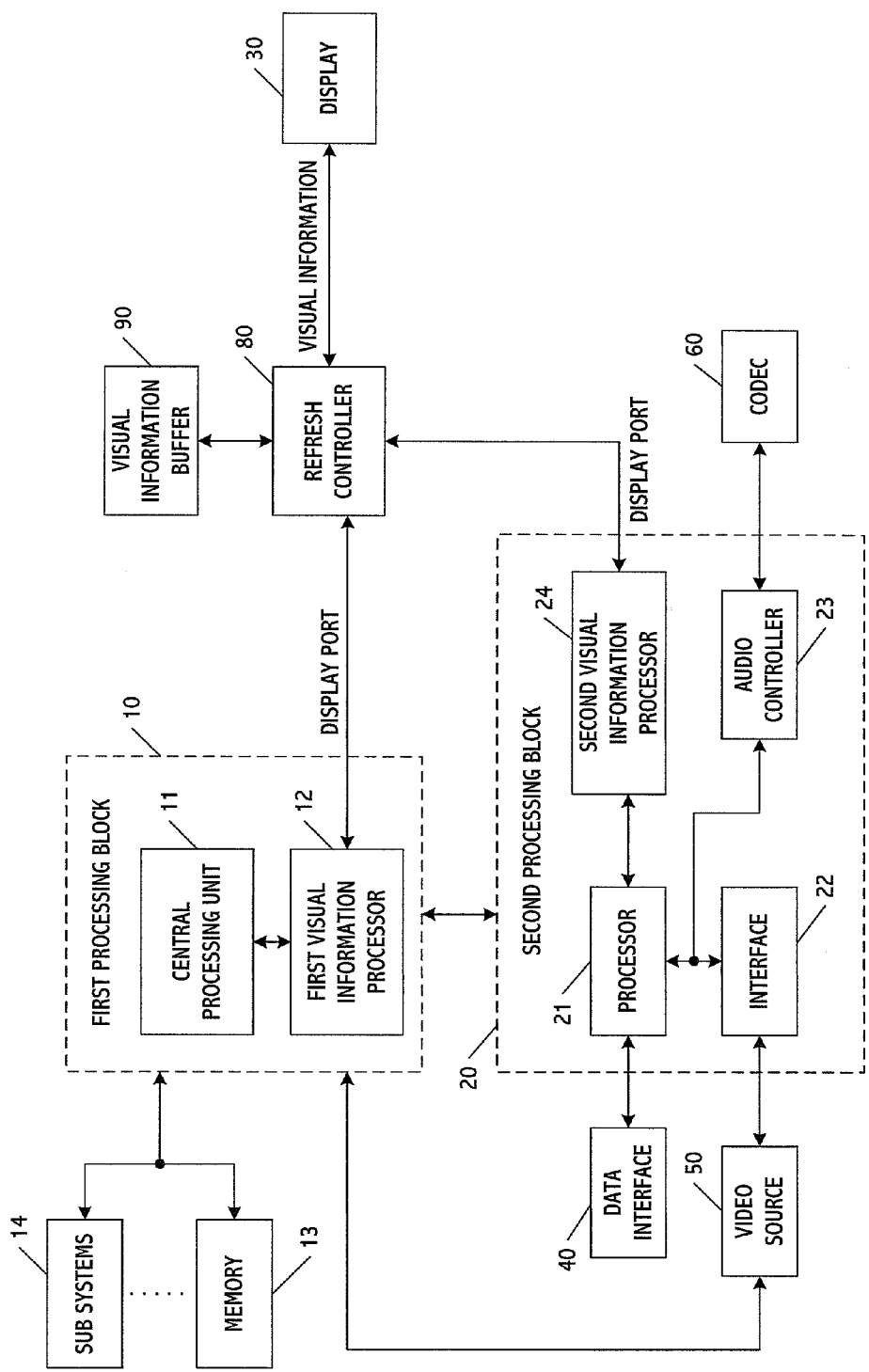
FIG. 1 shows one embodiment of a system for processing visual data.

FIG. 1 shows one embodiment of an apparatus for processing visual information. The apparatus includes a first processing block 10 and a second processing block 20 included within an electronic device. The electronic device may be portable or stationary an may include, for example, a mobile or smart phone, a pod- or pad-type device, an internet terminal, a media player, a gaming system, or a laptop or desktop computer.

The processing blocks may be physically located on different chips or included in different chipsets. In other embodiments, the blocks may be included in a same processing architecture, located either on a same chip or same package such as a system-on-chip (SoC) package.

The processing blocks may communicate with one another and/or may operate independently in different operational modes to control the display of visual information. The visual information may include graphics, video, or a combination of both. In one embodiment, the visual information includes graphics and video displayed in an application window dedicated to performing a Voice-over-Internet Protocol (VoIP) application such as Skype™, Facetime™, Vonage Video Phone™ or other video conferencing programs. In other embodiments, the visual information may be transmitted using a different communication protocol and/or a network different from the internet.

Additional examples include transmitting visual information over a gaming network or in connection with a gaming application or over a streaming media network or in connection with a streaming media application. In the aforementioned examples, the visual information is accompanied by voice information. In other embodiments, the visual information may be processed and transmitted without audio.

The first processing block includes a central processing unit (or main device processor) 11 and a first visual processor 12. The central processing unit (CPU) executes the operating system services and device driver software in support of the device and performs various control functions depending on the type of device and its peripherals. In one embodiment, the central processing unit may control one or more operations to be performed by the second processing block. The CPU may also be able to operate in different power modes, at least one of which includes a low-power or idle mode for purposes of power management control. This is especially useful when the device operates based on battery power.

The first visual processor 12 may process video, graphics, or both, in connection with an application running on the device. In a graphics application, processor 12 may provide two-dimensional or three-dimensional graphics either with or without video. Together, the CPU and first visual processor may be responsible for executing any of the aforementioned types of applications. For illustrative purposes, a VoIP application will be specifically discussed.

In a VoIP application, the CPU and first visual processor are responsible for initially executing the VoIP application including its audio and visual data. This data is output on a display 30 in connection with the application. (While not shown, the first processing block may also include an audio controller for outputting audio with the visual information). The visual data may be output in a predetermined format in accordance, for example, with a specific type of digital display interface. One example is a Display Port (e.g., embedded Display Port 1.3) interface, although a different interface or format may be used in other embodiments.

After a predetermined period of time, control of the audio and visual data processing may be handed off, in whole or part, to the second processing block. The predetermined period of time may be a predetermined lapse of time programmed into the operating system and/or may correspond to the occurrence of one or more conditions, such, as for example, the passage of a certain amount of time without any activity on the part of the CPU except for processing of the VoIP audio and visual data. The hand-off operation to the second processing block frees the CPU to perform other system-oriented functions and/or to enter a low-power state in order to save battery power. This hand-off operation may be controlled by the operating system or by proprietary platform integrated embedded software.

In order to assist the CPU, the first processing block may be coupled to a system memory 13 which, for example, may be one or more of a random access memory, cache, flash memory, or other storage device for storing data. The first processing block may also be coupled to one or more subsystems 14. The subsystems may include, for example, a mobile communication circuit, a USB-connected peripheral, one or more cameras, or other subsystems specific to the host device to be controlled by the CPU.

The second processing block 20 includes a processor 21, an interface 22, an audio controller 23, and a second visual information processor 24 which may be used to manage and output audio and/or visual data for the same application initiated and handled by the first processing block. The second processing block may be activated, for example, by a control signal output from the first processing block, for example, in order to allow processing to shift from the first processing block to the second processing block for a given application initiated by the first processing block. This shift may allow the first processing block including the CPU to enter a lower power state and/or handle other functions while the application is being implemented by the second processing block.

The processor 21 may receive the control signal from the first processing block to affect the control shift for the application. For a VoIP application, the processor may be coupled to a data interface 40 for receiving visual information from a network in association with the application. This interface may also receive audio data associated with the received visual information for output to a user of the device. In accordance with one example, data interface 40 may be a wireless fidelity (WiFi) interface. In other example, a different type of network interface may be used.

Notwithstanding the type of interface, processor 21 may receive visual information in the form of video through the network. The video may be streaming media content, real-time video conferencing images for a VoIP application, or another type of video or video from another type of source.

In accordance with one particular embodiment, processor 21 may be a Minute IA™ core processor provided by Intel Corporation and the second processing block may correspond to a platform controller hub (PCH). (In this case, the second processing block may be referred to as a Minute IA offload engine). The first and second processing blocks may communication with one another over a direct media interface (DMI) interface. In other embodiments, a different interface may be used. The processor of the second processing block may also perform a number of input/output and clocking functions, which are related to or separate from the VoIP application.

The interface 22 may be coupled to a video source 50. In a VoIP application, the video source may correspond to a webcam. In another application, the video source may correspond to stored media or other type of data. In a webcam application, the interface may be a Universal Serial Bus (USB) host interface connecting the camera's USB device interface into a USB host controller port such as those found on an eXtensible Host Controller Interface (xHCI) compatible USB host controller. In other embodiments, a different interface may be used for coupling to the video source.

The audio controller 23 processes audio data which may or may not be associated with the video data received by interface 22 and the audio data received through the data interface 40. For example, in a VoIP application which involves video conferencing between webcams, the audio controller may process audio received from a microphone of the host device through an encoder/decoder circuit 60, and may also output audio received from the network through data interface 40 for output through a speaker and/or headphones of the device.

The second visual information processor 24 may serve as a video and/or graphics accelerator for processing visual information received from both the data interface 40 and the video source 50. In this regard, the first and second visual information processors 12 and 24 may be similar to one another but not necessarily so. Under control of processor 21, the second visual information processor may output the video for presentation on the display for the VoIP application.

When the VoIP application involves a webcam-to-webcam video conferencing session, the second visual information processor may simultaneously output video of the users of both webcams in an application window on the display. The video may be output with other types of visual information including graphics and/or text. The graphics may correspond to various portions of a window of the VoIP application and the text may be associated, for example, with a texting window. The audio associated with this video may then be output under control of the processor 21.

The second visual information processor 24 may output the visual information in accordance with a predetermined format or interface standard. This standard may be the same format or interface used to output visual information from the first visual information processor 12, or may be a different format. For example, the second visual information processor may output visual information (e.g., video and/or graphics and/or text) using a Display Port interface format. In one embodiment, the display may be included in the device. In other embodiments, the display may be provided separately from the device including the first and second processing blocks and may be connected to the device through an appropriate interface. Also, the video information processors may be video accelerators implemented in hardware or a combination of hardware and software.

The system for processing visual information also includes a refresh controller 80. This controller performs the function of updating visual data on the display. In accordance with one embodiment, the visual data may be updated only with respect to that portion of the visual information that has changed. This may be accomplished using a buffer 90 which serves as a repository to temporarily store the visual information.

Figure 2:
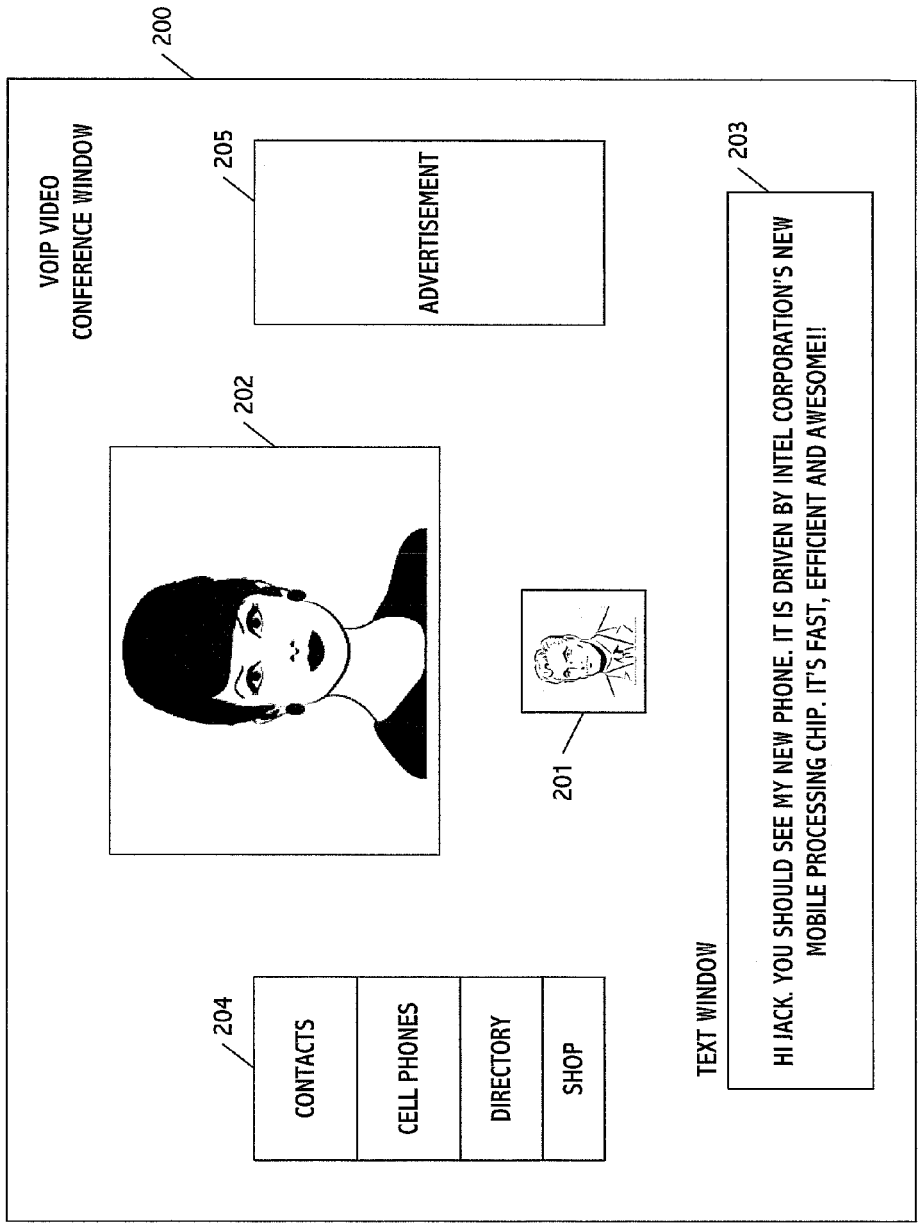
FIG. 2 shows an example of a window controlled by the system of FIG. 1.

FIG. 2 shows an example of a window 200 corresponding to a VoIP application which is controlled by the system of FIG. 1. This window includes a first area 201 for outputting visual information (e.g., video) of a user of a first webcam and a second area 202 for outputting visual information (e.g., video) of a user of a second webcam. The first webcam may be on a host computer or device of the system of FIG. 1 and the second webcam may be on a host computer or device of a terminal connected to the system of FIG. 1 through a network.

The window may also include a text area 203 for allowing the users to text messages to one another during a video conference, a menu 204 or other control panel for allowing users to access contact information, cell phone numbers, directory information, or shopping information while the window is open, and/or an area 205 for providing advertisement or coupon information. The information in areas 204 and 205 may be all graphics, text, image information or a combination of two or more of these. In one embodiment, the respective areas in the window may be considered to form a graphical user interface (GUI) for the application. Additional features which may be show in the window include an analog clock with the hands moving, information indicative of CPU load, and notification pop-ups.

In a VoIP application, a Panel Self Refresh (PSR) controller and buffer may be used to store visual information received from the second visual information processor at a given point in time, e.g., when control shifts from the first processing block to the second processing block for implementing the VoIP application. The visual information is received, for example, according to a predetermined frame rate(s) for webcam areas 201 and 202. These rates may be the same or different depending, for example, on the type of webcam, the network connection, etc.

The information outside areas 201 and 202 in the window may change, or not change, at a different rate. For example, the information in menu 204 may not change at all during the video conference unless a selection of a menu item is received during that time. The information in area 205 may change on a periodic basis, for example, to display different advertising information or coupons for different products.

Figure 3:
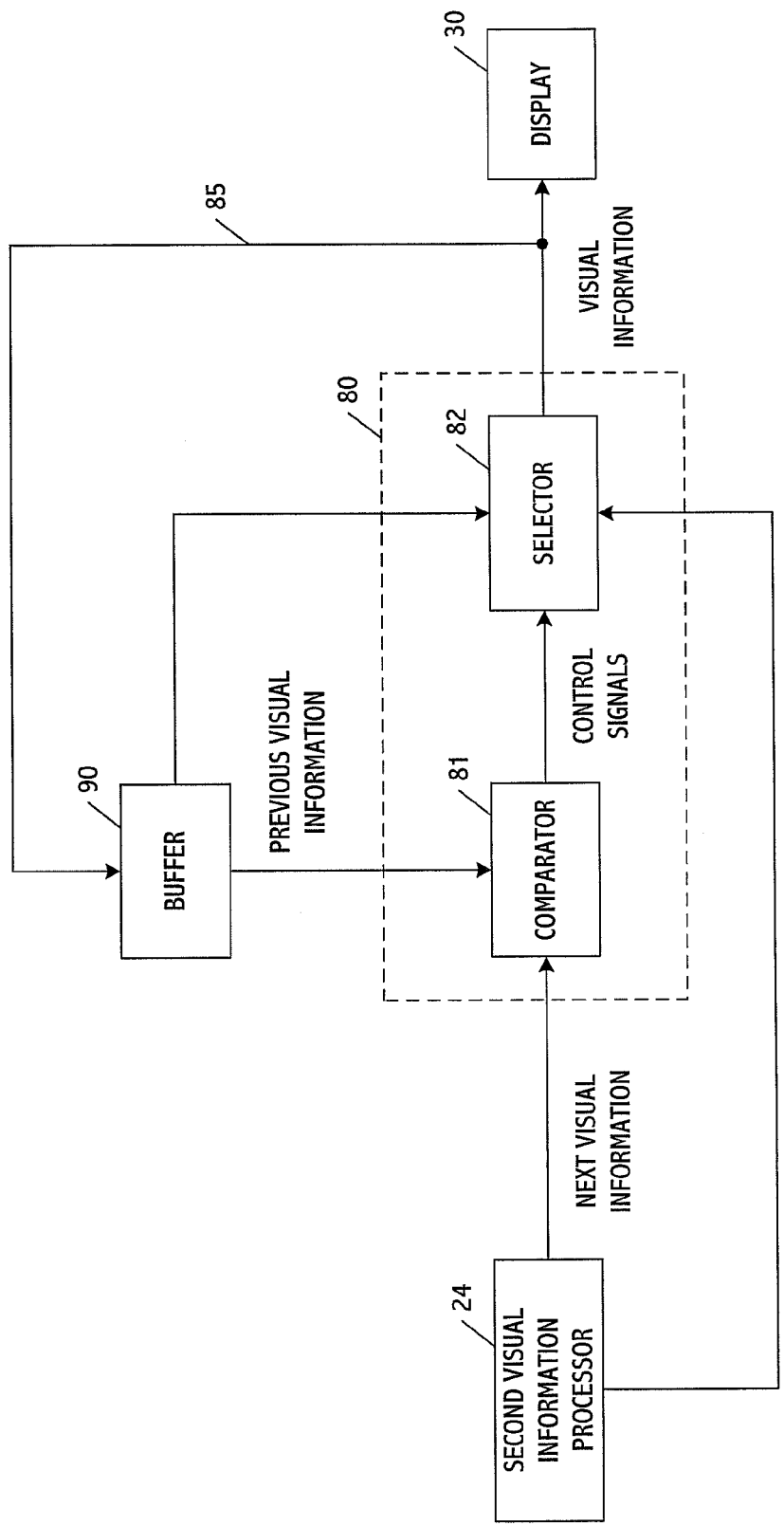
FIG. 3 shows an example of a PSR controller in the system of FIG. 1.

FIG. 3 shows an example of the refresh controller which includes a comparator 81 and a selector 82. In operation, the comparator compares the visual information stored in window 200 for a first frame (or page) with visual information of the window received in a subsequent frame (or page) to determine the differences between them. Based on this comparison, control signals will be generated to identify which portions of the visual information have changed and which portions have not changed.

For example, in window 200, the video in areas 201 and 202 may continuously change throughout the video conference but the visual information in areas 204 and 205 may not change or may change only periodically. Thus, for a given point in time, the comparator may generate control signals indicating that areas 204 and 205 have not changed between the first frame and subsequent frame and control signals indicating that areas 201 and 202 have changed.

Based on the control signals from the comparator, selector 82 selects which visual information is to be output in the application window. For example, the selector may select the visual information in the subsequent frame (or page) to be output in areas 201 and 202 and may select the visual information stored in buffer 90 from the first frame to be output in areas 204 and 205. If not change has occurred in the text window 203, the information stored in the buffer corresponding to the text window may also be output to the display. Visual information may be sent for storage in the buffer along a feedback path 85 coupled between an output of the selector and the display.

The refresh controller may therefore be said to perform a partial refresh (or update) of the visual information in the application window. In the event that the comparator determines that none of the information changes from one frame to another, the selector may select the entire frame buffer to be output to the display to thereby perform a full refresh (or update) of the visual information in the window.

By outputting the buffered visual information to the display, the amount of power consumed in generating the visual information in window 200 may be significantly reduced. Also, by having the refresh controller perform this function instead of the CPU, additional power savings may be achieved and the CPU may be placed in a lower power state or may be used to perform other device functions during this time.

The rate at which the refresh controller operates (and thus the rate at which the comparator performs its comparisons) may be determined, for example, frame rate of the video to be shown in areas 201 and 202. This may be determined, for example, by the webcams that generate this video. Alternatively, the refresh controller may operate at a rate determined by control software of the refresh controller. Also, the visual information to be compared may be successive adjacent frames (or pages) or may be non-adjacent frames separated by a predetermined interval of time or predetermined number of frames.

In accordance with one embodiment, the refresh controller 80 may be referred to as a panel self-refresh (PSR) controller. This controller may be implemented in various ways. For example, the PSR controller may operate as a PSR Display Self Refresh (PSU_DSR) controller which autonomously refreshes (or updates) the visual information in the full application window when none of the visual information changes between frames or pages.

Alternatively, the PSR controller may operate as a PSR Display Partial Update (PSR_DPU) controller which selects for output to the display from the first and second information processors only that visual information in the application window that changes between frames or pages. The remaining information that has not changed is output by the PSR controller from the buffer. As previously indicated, the information stored in the buffer may include all the information in the application window, including video, image, graphics, and text as well as other information.

The foregoing embodiments, therefore, may take a two-stage approach to reducing power consumption in the host device. First, control is shifted from the first (CPU) processing block to the second processing block for a given application after a predetermined time or condition, to thereby allow the CPU to enter a lower power state or to perform other device functions while simultaneously allowing the second processing block to handle the visual (or both visual and audio) information processing requirements of the application. This is especially useful when the application is a VoIP conferencing or gaming application.

Second, the refresh controller is used instead of the CPU to output only that visual information in an application window that changes from frame-to-frame or time-to-time, with the remaining visual information that has not changed being output from a buffer. In this way, the refresh controller may be said to work offline relative to CPU operation. Moreover, operation of the visual information processors may be restricted from processing graphics or video that does not change.

Moreover, as shown in FIG. 1, the panel self-refresh controller is coupled to the first and second visual information processors through respective interface ports. The refresh controller may therefore be said to provide a two-input-port and one output port interface for controlling output of visual information to the display in a VoIP, gaming, or other application that involves the use of visual information. In other embodiments, the refresh controller may provide N-input ports where N is greater than two.

Figure 4:
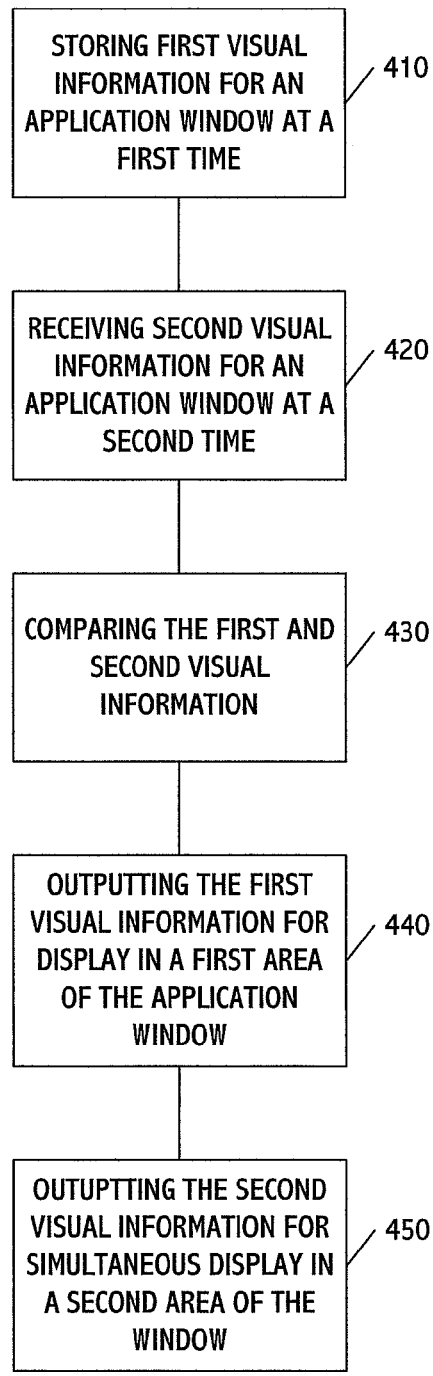
FIG. 4 shows one embodiment of a method for displaying visual information.

FIG. 4 shows operations included in one embodiment of a method for controlling the display of visual information for an electronic device. The electronic device may, for example, be any of those previously described and the method may be implemented by the apparatuses shown in FIGS. 1-3 of by a different apparatus or system.

An initial operation of the method includes storing first visual information for an application window at a first time. (Block 410). The information may be stored in a buffer located in or coupled to the electronic device. The buffer may correspond to the visual information buffer in FIG. 1 or another storage device may be used. The first time may correspond to receipt of a first frame or page of information to be displayed in the application window. This frame or page of information may be included as part of a graphical user interface for the application, but this is not necessary for all embodiments.

In one embodiment, the visual information includes video from a first webcam connected to the device through a network (e.g., the Internet) and video from a second webcam included within or coupled to the device through a local interface (e.g., a USB cable). This embodiment is particularly suitable for a VoIP video conferencing application, a gaming application, or another application that uses webcam video.

The visual information may include image information, video information, graphics, information, or text or a combination of any of these. This information may be initially processed and received from a central processing unit block and then later processed by another processing block in order to allow the CPU block to enter a reduced power state or to allow the CPU block to handle other operations. This may be particularly useful when the device is a smart phone or pod- or pad-type device where multiple communication-related operations may need to be performed in an continuous or periodic basis.

Another operation of the method includes receiving second visual information for the application window at a second time. (Block 420). The visual information received at this second time may be from one or more of the same sources as the visual information received for the application window at the first time, or may be or partially be from different sources. Also, like the information received at the first time, the visual information received at the second time may include image information, video information, graphics, information, or text or a combination thereof.

A next operation includes comparing the first visual information and the second visual information. (Block 430). This operation may be performed, for example, by the comparator shown in FIG. 3 or another type of comparison circuit. The first and second visual information is compared in terms of its content to locate differences between the first and second visual information. Once the differences, if any, have been determined, control signals may be generated to control the output of all or portions of the first and second visual information to be displayed on a screen of the electronic device or, alternatively, a screen coupled to the electronic device.

For example, as shown in FIG. 2, the first and second visual information may correspond to different areas of an application window. One area may be dedicated to displaying video from a webcam and another area graphics or icons corresponding menu, advertising, logo, text or other information. The comparing operation in Block 430 may be performed to determine differences in the content stored in these areas.

A next operation includes outputting first visual information for display in a first area of the application window (Block 440) and second visual information for simultaneous display in a second area of the application window (Block 450). Although these blocks are shown in FIG. 4 in succession, in one embodiment the operations of these blocks may be performed prior to output to the display.

Moreover, the operations of these blocks are performed based on the comparison in Block 430. The first visual information is included in the stored visual information and the second stored visual information is received from one or more sources different from a buffer storing the first visual information. In accordance with one embodiment, the stored first visual information may correspond to graphical information associated, for example, with a menu of the application window or advertising or coupon information to be displayed in that window.

The second visual information may correspond to real-time (or near real-time) or video that continuously changes. In one embodiment, the video may derive from one or more web- or network cams. In another embodiment, the video may be streaming video corresponding to a media event or content. In another embodiment, the first visual information and the second visual information may derive from a webcam.

In any of the foregoing embodiments, the first visual information may not change between the first and second times and the second visual information may change between the first and second times. The first and second times may correspond to the times between successive frames or pages to be displayed for the application window. Alternatively, the first and second times may correspond to times of non-adjacent frames or pages separated, for example, by a predetermined number of intervening frames or time periods. The first and second visual information may combined in a format that corresponds to the application window and then simultaneously output to for display in that window.

Figure 5:
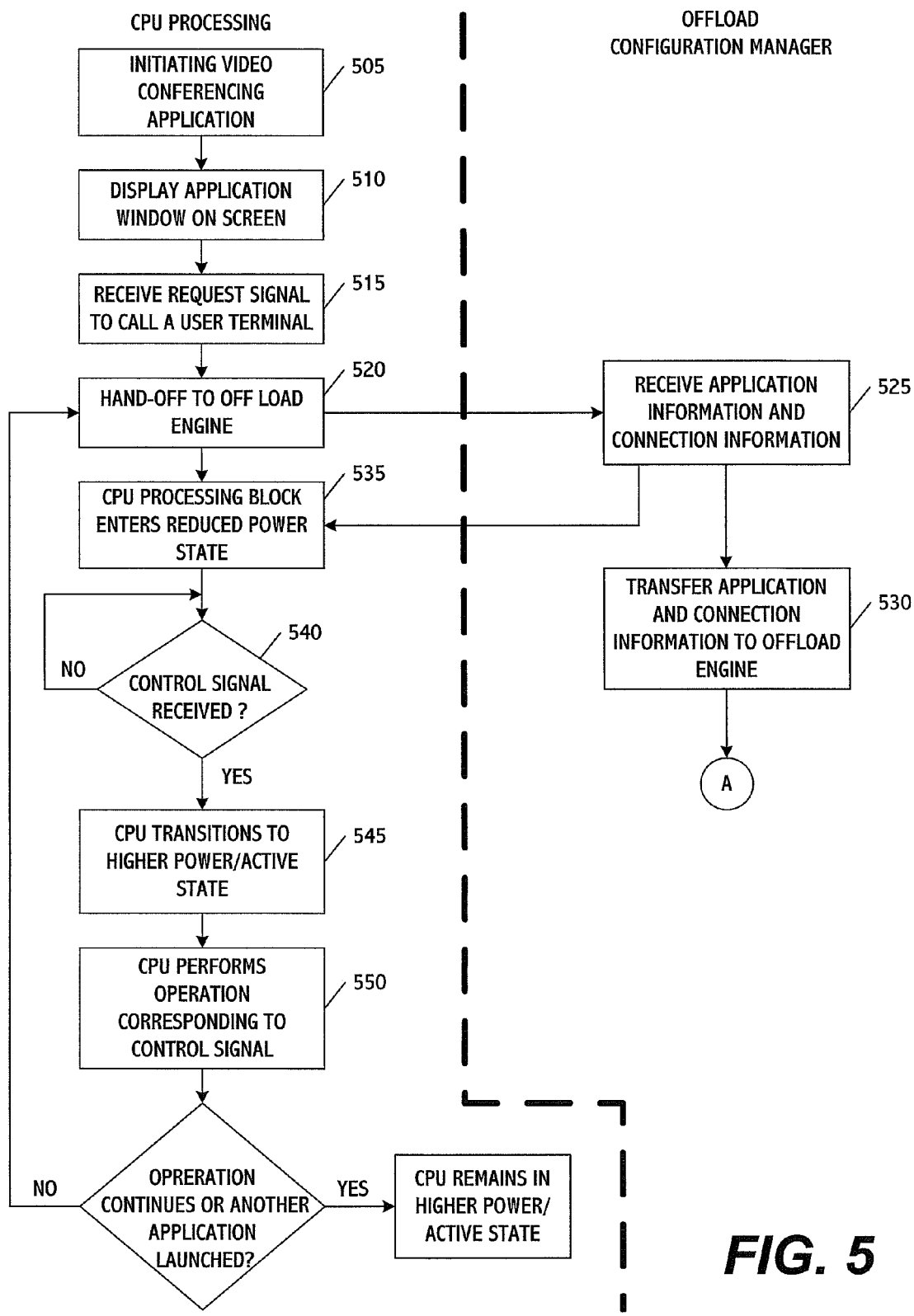
FIG. 5 shows another embodiment of a method for displaying visual information.

FIG. 5 shows operations included in another embodiment of a method for controlling the display of visual information for an electronic device. In this method, the operations are divided between those performed by a first processing block that includes, for example, a CPU of the device and a second processing block labeled as an offload engine. This embodiment may be a more detailed application of the embodiment of FIGS. 1 and 4 or may be a different embodiment. For illustrative purposes, the method of FIG. 5 will be described for a VoIP video conferencing application.

An initial operation includes receiving a signal to initiate the application. (Block 505). This signal may be generated, for example, as a result of a user selecting a screen icon, a key on a key pad, or a dedicated button on the host electronic device, e.g., a smart phone, a pad- or pod-type device, or a computer. The signal may be received by the CPU of the device or another type of main processor implementing the operating system software of the device.

After the signal has been received, a window corresponding to the application is displayed. (Block 510). The window may be in the form of a graphical user interface or other type of predetermined screen format that corresponds to VoIP video conferencing to be performed. The window may take up the entire screen or may be minimized to a size less than the entire screen size. The screen may correspond to the window shown in FIG. 2 or may have another format.

A subsequent operation includes receiving a request signal to call or otherwise establish a connection to the terminal of another user. (Block 515). The request signal is generated, for example, as a result of a user entering the contact information of the user to be called or used in establishing the connection in a pre-designated area of the application window. Up to this point, all operations may be performed by the CPU of the electronic device.

After the signal indicating that the call or connection is to be initiated, procedures are instituted by the CPU to hand off control of the application to an offload engine, which, for example, may correspond to the second processing block such as shown in FIG. 1. (Block 520). These procedures may involve transferring information including application window display coordinates, size, and connection information to the offload engine. These transfer procedures may be implemented by an offload configuration manager located within or external to the CPU processing block. (Block 525). The configuration manager may be implemented by the device operating software corresponding to the CPU block.

Once received by the configuration manager, the information is transferred to a processor of the offload engine corresponding to the second processing block. (Block 530). The offload engine will then take over control of the application. Because the offload engine is not in the CPU processing block, transfer of control from the CPU to the offload engine will free up the CPU to perform other functions unrelated to the application window and/or to enter a reduced power state to thereby save power.

After the configuration manager receives the application window and connection information, a confirmation signal is sent to the CPU in the main processing block. In response to this confirmation signal, the CPU is controlled by the operating software to, as stated, perform another control function or to enter a reduced power state. For illustrative purposes, the reduced power state will be discussed.

When the confirmation signal is received from the configuration manager, the CPU enters a reduced power state under control of the operating software. (Block 535). The reduced power state may be an idle state, a sleep state, a deep sleep or idle state or another type of low power state. In this state, the CPU monitors whether a control signal relating to the running application is received. (Block 540).

As long as no control signal is received, the CPU continues in the reduced power state and the monitoring operation continues. The circumstances under which no control signal is received includes when the video conferencing session continues without any additional control feature relating to the application being performed.

However, if a control signal or interrupt is received, the CPU transitions to a higher power, more active state to handle processing operations relating to the control event. (Blocks 545). In accordance with one embodiment, a control signal may be generated, for example, when the video conferencing session ends, when a menu item in the application window is selected, when advertising information in the application window is selected when a mouse cursor is moved, when chat or text information is entered into a text area of the application window, or when another application is called or internet search is to be performed during a video conferencing session.

Control events generated by any of these events may trigger the CPU to exit the reduced power state in order to handle the operation associated with the control event. (Block 550). After this transition of the CPU, control of the application may entirely shift back to the CPU or the offload engine may continue to process visual information associated with the application and the CPU may just be used to handle the specific operation associated with the control signal. Of course, if the control signal relates to webcam video, then control of the application may shift entirely back to the CPU, at least for a predetermined period of time programmed into the operating software.

In the foregoing method, a hand-off operation was described as being triggered after a signal was received requesting that a video conferencing call be established by the application. Alternatively, the hand-off operation may not be performed until a predetermined period of time after the call has been established and a video conferencing session has begun. This time period may be programmed into the operating system or application software.

Figure 6:
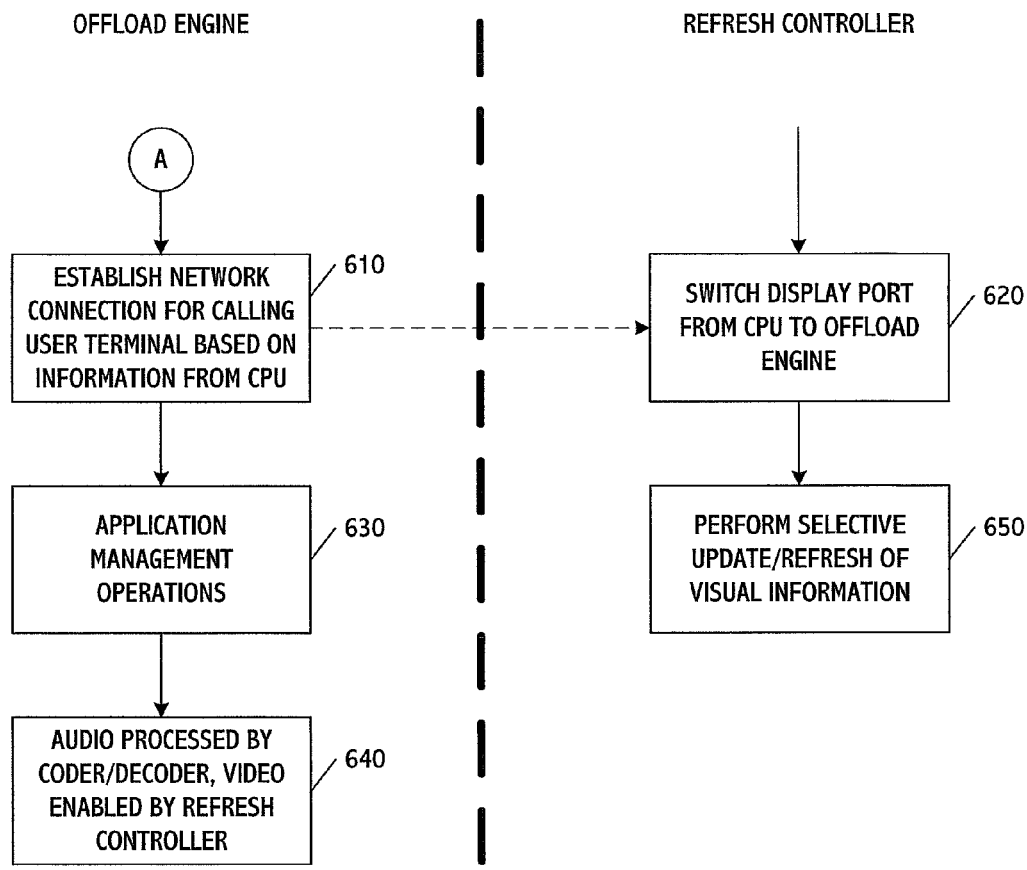
FIG. 6 shows additional operations in the method of FIG. 5.

FIG. 6 shows operations which may be performed by the offload engine after the application and connection information is transferred from the CPU in Block 530 in FIG. 5. These operations include having a processor of the offload engine establish the network connection to the called user terminal based on the connection information transferred by the CPU. (Block 610). This operation assumes that the CPU has not yet established the connection or call and that this function is to be performed by the offload engine.

In other embodiments, the call or connection may have already been established by the CPU and then the transferred information in Block 530 may allow the offload engine to merely continue the video conferencing session that has already been established by the CPU.

In another operation, a control signal is sent to a refresh controller coupled to the CPU and offload engine by different display ports. The control signal causes the refresh controller to shift control from receiving information from the CPU to receiving information from the offload engine. (Block 620). The control signal may be generated by the CPU based on operating system software or may be generated by the offload engine, for example, concurrently with (as indicated by the dotted line), before or after the network connection is established by the offload engine.

The display ports may be switched, for example, by a multiplexer circuit coupled in advance of or located within the refresh controller. This multiplexer may be responsive to the control signal sent to the refresh controller to perform the switching operation.

After the display port switching operation is performed, the offload engine performs management operations to control the application. These operations may include managing the network connection to the other user terminal in the video conference, performing network stack management operations, data interface 40 (e.g., xHCI) management, audio-visual data processing in a stream received from the other user terminal, and/or audio-visual data processing of a stream to be transmitted to the other user terminal through the network. (Block 630).

In performing audio-visual processing, the audio may be processed by an encoder/decoder circuit (e.g., Codec 60 in FIG. 1) and the video may be sent to the refresh controller and buffer for selective output as previously described. (Block 640). At the refresh controller, the functions of selective refresh/update may be performed as previously described, e.g., as described in relation to any one of FIGS. 1, 2 3, and 4. (Block 650).

Any reference in this specification to an "embodiment" means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. Also, the features of any one embodiment described herein may be combined with the features of one or more other embodiments to form additional embodiments.

Furthermore, for ease of understanding, certain functional blocks may have been delineated as separate blocks; however, these separately delineated blocks should not necessarily be construed as being in the order in which they are discussed or otherwise presented herein. For example, some blocks may be able to be performed in an alternative ordering, simultaneously, etc Although the present invention has been described herein with reference to a number of illustrative embodiments, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

We claim:
1. An apparatus comprising:
a controller to control display of information in an application window based on first visual information stored in a buffer and second visual information from one or more sources,
the controller to output at least part of the first visual information from the buffer for display in a first area of the application window and to output at least part of the second visual information from the one or more sources for simultaneous display in a second area of the appli- cation window while the part of the first visual information is displayed in the first area, and
wherein the controller includes:
a comparator to compare the first visual information stored in the buffer for the application window for a first time and the second visual information received from the one or more sources for a second time, the comparator to provide both a first control signal and a second control signal for complete display in the application window, the first control signal to indicate that a first part of the first visual information corresponding to the first area of the application window does not change between the first time and the second time, and the second control signal to indicate that a second part of the first visual information corresponding to the second area of the application window changes between the first time and the second time; and
a selector to receive both the first control signal and the second control signal from the comparator, the selector to select the at least part of the first visual information from the buffer for the first time and corresponding to the first area of the application window based on receipt of the first control signal from the comparator, and the selector to select at least part of the second visual information for the second time corresponding to the second area of the application window based on receipt of the second control signal from the comparator, and the selected part of the first visual information corresponding to the first area to be simultaneously displayed at the application window with the selected part of the second visual information corresponding to the second area;
wherein the one or more sources include:
a first camera to generate first video information, and
a second camera to generate second video information, wherein the second visual information is to include the first and second video information from the first and second cameras.

2. The apparatus of claim 1, wherein the first time is to correspond to a first frame of the information to be displayed in the application window and the second time is to correspond to a second frame of the information to be displayed in the application window.

3. The apparatus of claim 2, wherein the first frame and the second frame are to be separated by a predetermined period of time or a predetermined number of frames.

4. The apparatus of claim 1, wherein the controller is coupled to:
a first visual information processor, and
a second visual information processor, wherein:
the first visual information processor is to correspond to a central processing unit (CPU) block and the controller is to switch control from the first processor to the second processor to output the visual information for display in the application window when a predetermined condition occurs.

5. The apparatus of claim 4, wherein the predetermined condition is to correspond to a predetermined period of time after call up of the application window.

6. The apparatus of claim 1, wherein the first visual information and the second visual information are to be selected from the group consisting of image information, video information, graphics information, and text information.

7. The apparatus of claim 1, wherein the first visual information is to include graphics or text information and the second visual information is to include image or video information.

8. The apparatus of claim 1, wherein the one or more sources are to correspond to one or more network cameras.

9. The apparatus of claim 1, wherein the application window is to be a Voice-over-Internet Protocol (VoIP) application window to perform video conferencing.

10. A device comprising:
a display;
a controller to control display of information in an application window output on the display based on first visual information stored in a buffer and second visual information from one or more sources, the controller to output at least part of the first visual information from the buffer for display in a first area of the application window and to output at least part of the second visual information from the one or more sources for simultaneous display in a second area of the application window while the part of the first visual information is displayed in the first area, and
the controller includes:
a comparator to compare the first visual information stored in the buffer for the application window for a first time and the second visual information received from the one or more sources for a second time, the comparator to provide both a first control signal and a second control signal for complete display in the application window, the first control signal to indicate that a first part of the first visual information corresponding to the first area of the application window does not change between the first time and the second time, and the second control signal to indicate that a second part of the first visual information corresponding to the second area of the application window changes between the first time and the second time; and
a selector to receive both the first control signal and the second control signal from the comparator, the selector to select the at least part of the first visual information from the buffer for the first time and corresponding to the first area of the application window based on receipt of the first control signal from the comparator, and the selector to select at least part of the second visual information for the second time corresponding to the second area of the application window based on receipt of the second control signal from the comparator, and the selected part of the first visual information corresponding to the first area to be simultaneously displayed at the application window with the selected part of the second visual information corresponding to the second area;
wherein the one or more sources include:
a first camera to generate first video information, and
a second camera to generate second video information, wherein the second visual information is to include the first and second video information from the first and second cameras.

11. The device of claim 10, wherein the first time is to correspond to a first frame of the information to be displayed in the application window and the second time is to correspond to a second frame of the information to be displayed in the application window.

12. The device of claim 11, wherein the first frame and the second frame are to be separated by a predetermined period of time or a predetermined number of frames.

13. The device of claim 10, wherein the controller is to switch control from a first visual information processor to a second visual information processor when a predetermined condition occurs, wherein the first visual information processor corresponds to a central processing unit (CPU) block.

14. The device of claim 13, wherein the CPU block operates in a reduced power state after control is switched from the first visual information processor to the second visual information processor.

\* \* \* \* \*